Patented Jan. 28, 1941

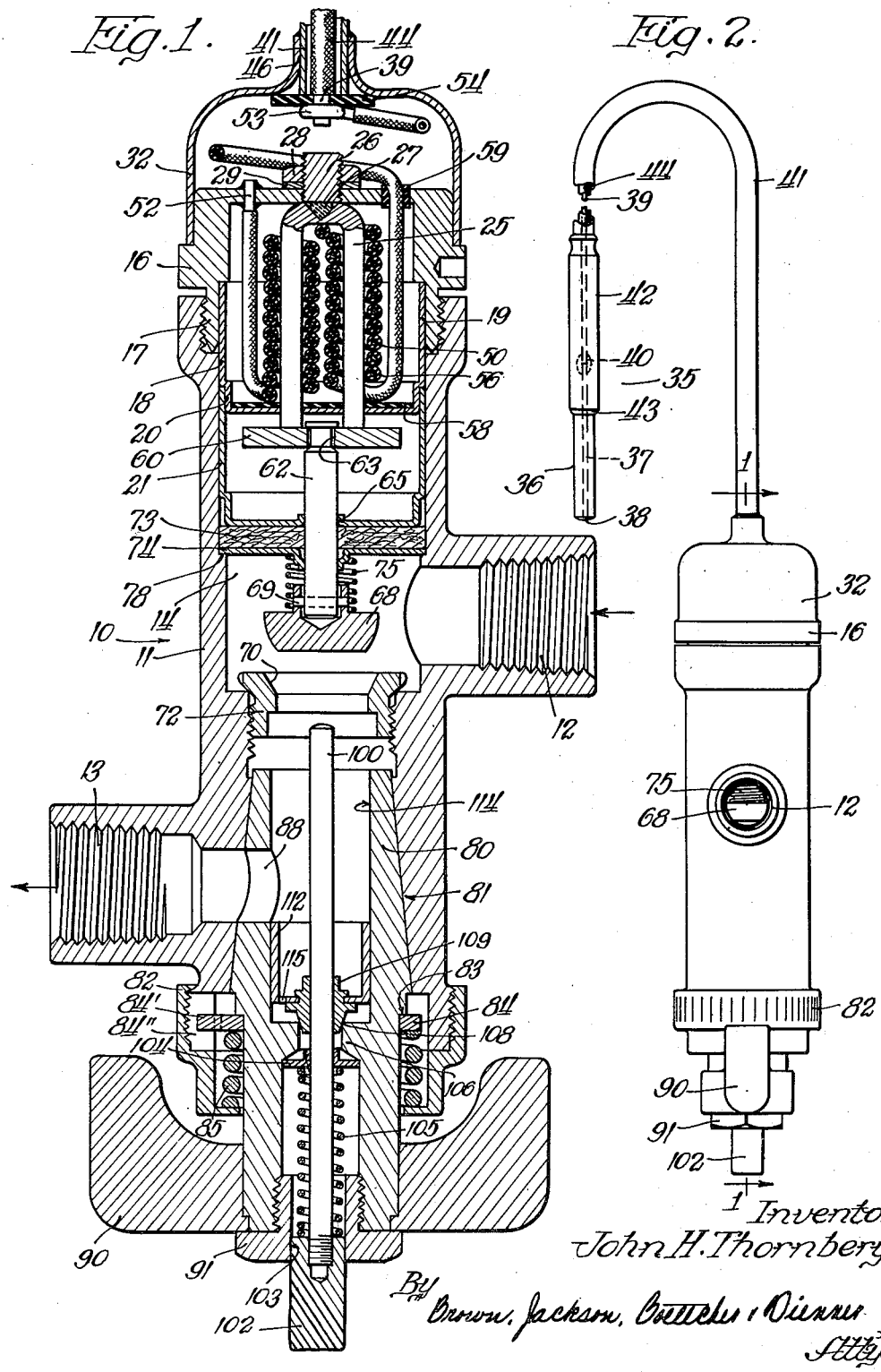

2,229,826

UNITED STATES PATENT OFFICE 2,229,826

COMBINED SAFETY CONTROL DEVICE AND SHUT-OFF COCK

John H. Thornbery, Milwaukee, Wis., assignor to Milwaukee Gas Specialty Company, Milwaukee, Wis., a corporation of Wisconsin Application November 10, 1938, Serial No. 239,791

18 Claims. (Cl. 277—25)

This invention relates to a combined safety control device and shut-off cock.

In the illustrated embodiment of the invention the shut-off cock is in the form of a conical valve plug adapted for shutting off the flow of fuel to a burner, and the safety control device is in the form of a thermo-electric control device of the general character shown and described in John H. Thornbery and Harold A. Mantz Patent No. 2,126,587, granted August 9, 1938, and in the copending application of Clarence Wantz, filed November 10, 1938, Serial No. 239,790.

Heretofore in the art it has been customary to make the shut-off cock and safety control device in the form of separate devices and to connect same separately into the fuel supply line for the burner, which may be the burner for an oven or for a room heater, or water heater, or one or more of the top burners of a gas range, or any other burner. This increases the manufacturing and installation costs and requires separate joints and connections in the fuel supply line for the shut-off cock and control devices, and presents other disadvantages which the present invention overcomes.

While the particular device which I shall describe hereinafter in connection with the drawing has the valve member of the thermo-electric control device connected to the armature for movement to open and closed positions with movement of the armature to attracted and retracted positions, it is to be understood that the invention is not limited to use in this particular form of device but may be employed in all similar forms of devices—by way of example, in devices in which the movement of the armature controls a switch connected in circuit with a solenoid valve which is operable to open and close the fuel supply line to the burner.

One of the main objects of my invention is to obviate the disadvantages heretofore presented where the safety control device and shut-off cock are in the form of separate devices by providing as a new and complete article ready for use a combined shut-off cock and safety control device of the character set forth formed as a unitary device.

It is also an object of my invention to provide a combined safety control device and shut-off cock of relatively simple and inexpensive construction, and which may be installed and operated conveniently and effectively; also a device of this character composed of relatively few parts and adapted for convenient and expeditious manufacture and assembly.

Further objects and advantages of the invention will be apparent from the following detailed description taken in connection with the accompanying drawing, in which:

Figure 1 is an axial section through a combined safety control device and shut-off cock embodying the present invention on an enlarged scale, and taken on the line I—I of Figure 2; and Figure 2 is an elevational view of the same showing the connected thermocouple therefor.

Referring to the drawing, the thermo-electric control device and shut-off cock designated in its entirety at 10 comprises a valve body 11 having an inlet 12 and an outlet 13 by means of which the device is connected into the fuel supply pipe (not shown). The inlet and outlet may be reversed, i. e., the opening 13 may be the inlet and the opening 12 the outlet. The fuel supply pipe supplies gaseous or any other suitable fuel to the burner, which may be any suitable or preferred main burner,—by way of example, for an oven, or for a room heater, or a water heater, or it may be one or more of the main top burners of a gas range, or any other burner.

The lead connection cap and magnet and armature housing assembly mounted upon the top of the valve body 11, as the same is viewed in Figure 1, and closing the upper end of the bore 14 thereof is, in some respects, of the general character disclosed and claimed in the previously mentioned copending application of Clarence Wantz. The metallic magnet base 16 has an externally threaded extension 17 threaded into the upper end of the valve body 11. The magnet housing 18 is in the form of an upwardly opening cup-shaped metal shell mounted on the magnet base 16,—for example, by secure pressed fit engagement of its open upper end in the magnet base at 19. The housing or shell 18 is reduced at its lower end at 20, and the armature housing 21, which is also in the form of an upwardly opening cup-shaped metal shell, is mounted on the shell 18,—for example, by secure pressed fit of its open upper end telescopically over the reduced lower end 20 of the shell 18. The lower end of the shell 21 is preferably reduced as shown.

The electromagnet comprises a generally U-shaped magnet frame 25 positioned within the shell 18 with its legs extending through openings in the lower end of this shell and presenting pole ends within the armature housing 21. The magnet frame 25 has a threaded stud 26 welded or otherwise rigidly joined thereto at 27, or formed integral therewith. The stud 26 is threaded through the top of the magnet base 16 and has threaded engagement with a nut member 28 for clamping the magnet frame rigidly and, at the same time, removably in place. A spring washer may be provided between the nut member 28 and the top of the magnet base 16 as indicated at 29. A metallic cover 32 is mounted upon the top of the magnet base 16 in good conductive contact therewith.

The thermocouple and lead connection therefor are of the general character disclosed and claimed in Oscar J. Leins Patent No. 2,126,564, granted August 9, 1938. The thermocouple 35 comprises an outer tubular metallic thermocouple member 36 and an inner metallic thermocouple member 37 disposed within the outer thermocouple member and joined at one end to the end of the outer thermocouple member to form the thermal junction 38 which is placed in position to be heated—for example, by the pilot light for the main burner. An inner lead conductor 39 is joined to the inner thermocouple member to form an internal thermal junction 40, and an outer tubular lead conductor 41 is connected through a sleeve 42 to the outer thermocouple member to form a third thermal junction 43. The outer lead conductor 41 and sleeve 42 enclose the inner lead conductor and, with the outer thermocouple member, constitute an enclosure about the inner thermocouple member and the inner lead conductor and the inner thermal junction 40. The inner lead conductor 39 is insulated from the outer lead conductor by a wrapping of insulation on the inner lead conductor as indicated at 44.

The inner and outer lead conductors 39 and 41 are preferably of a character that will permit bending, as desired, to permit disposing the thermocouple in any desired position. At the same time, the lead connection is preferably of a character to support the thermocouple in any desired position, although supporting brackets or other means may be employed for supporting the thermocouple and lead connection. At the opposite end the outer lead conductor 41 is secured in a sleeved opening in the cover 32 and in good conductive contact with the cover at 46. The inner lead conductor 39 extends from the end of the outer lead conductor 41 and into the cover 32 as shown in Figure 1.

The electromagnetic coil 50 surrounds the legs of the magnet frame 25. One bared end of the coil lead is connected at 52 to the top of the magnet base 16 in a manner to have good conducting contact therewith, the coil terminal 52 being thereby connected through the magnet base and the cover 32 to the outer tubular lead conductor 41 which is connected to the cover 32 at 46. The opposite end of the coil 46, or the coil lead therefor, is connected at 53 to the inner end of the inner lead conductor 39 in a manner to have good conducting contact therewith. An insulator 54 is interposed between the connection at 53 and the cover 32 and outer lead conductor 41. The coil 50 is preferably covered with insulation between its bared ends at 56. Suitable insulation may be interposed between the lower end of the shell 18 and the adjacent end of the coil 50 as shown at 58, and additional insulation may be interposed between the turns of the coil and the legs of the magnet if and as desired. An insulator may be provided at 59.

The armature 60 is disposed in the armature housing 21 and is adapted to be held in attracted position against the pole ends of the magnet frame 25 upon energization of the electromagnet. The armature 60 is of disc-like form, and is secured to the upper end of a reciprocatory valve stem 62. The attachment of the armature to the valve stem 62 at 63 is preferably sufficiently loose, as indicated more or less diagrammatically, to permit self-accommodation of the armature to the pole ends of the magnet frame by a generally universal movement of the armature upon the upper end of the valve stem. The stem 62 is disposed generally concentrically with respect to the armature housing 21 and extends downwardly for reciprocating movement through an opening 65 in the lower end of the housing 21.

The valve member 68 is fixed by a pin 69 upon the lower end of the valve stem 62, preferably for some relative movement thereon, so as to have self-accommodating sealing engagement with the cooperating valve seat 70 at the upper end of the valve seat member 72. Packing 73 of felt or other suitable or preferred material is interposed between the bottom of the armature housing 21 and a metal valve spring seating disc 74. The valve spring 75 is in the form of a coiled compression spring interposed between the valve member 68 and the spring seating disc 74, and centered, if desired, at opposite ends about integral hub-like portions on the valve member 68 and valve seating disc 74. The spring 75 resiliently moves the armature 60 to retracted position, and the valve member 68 into seating engagement with the valve seat 70 to shut off the flow of fuel to the outlet 13 and thereby to the burner when the electromagnet is deenergized.

The disc 74 seats downwardly upon a shoulder 78, and the action of the spring 75 tends to compress the packing 73 and maintain same in sealing engagement with the bore 14 and with the valve stem 62 to seal the interior of the armature housing 21 from the gaseous or other fuel which passes through the valve body and to seal the valve body against the escape of fuel out around the magnet base 16 and magnet and armature housings.

The magnet base and magnet and armature housing assembly is of simple and inexpensive construction, and is adapted to be applied to and removed from the valve body 11, or similar structure, expeditiously and as a unitary structure. At the same time, the armature housing 21 is detachable from the magnet housing 18 to permit access to the armature 60 and the pole ends of the magnet frame 25. The magnet housing 18 may also be adapted for detachment from the magnet base 16 to permit access to the magnet frame 25 and magnet coil 50.

The heat of the pilot light (not shown) upon the thermal junction 38 of the thermocouple will set up a thermo-electric current sufficient to cause the electromagnet to hold the armature 60 in attracted position and the valve member 68 in open position as shown when the armature is engaged with the pole ends of the magnet frame, but the thermo-electric current is not capable of moving the armature to attracted position and the valve member 68 to open position. In order, therefore, to provide for opening the valve member 68 and for setting the armature to attracted position upon initial operation of the device and to reset the device after the same closes to shut off the fuel supply when the pilot light is extinguished, reset means is provided, and this reset means is combined with the shut-off cock in a manner which will now be described.

The shut-off cock is in the form of a hollow truncated conical plug 80 with its conical surface seated in a corresponding truncated conical bore 81 in the lower end of the valve body 11. Threaded upon the lower end of the valve body 11 is a spring cap 82 which may be knurled externally, as shown in Figure 2. Disposed within the cap 82 and abutting a shoulder 83 on the plug member 80 is a stop disc 84. The disc 84 is fixed on the valve plug 80 for rotation with the plug by splaying the sides of the plug and forming the opening in the disc of conforming configuration. The disc 84 has a lug 84' which operates in a slot or circumferential opening 84" in the lower end of the valve body 11 and limits the rotation of the shut-off cock to about 90 degrees in one extremity, with the port 88 in full registration with the outlet 13 and, at the other extremity, with the port 88 completely out of register with the outlet 13.

A coiled spring 85 is interposed between the stop disc 84 and the lower end of the cap 82 and acts to maintain the conical surface of the plug 80 resiliently and, at the same time, tightly seated in the bore 81. The plug 80 has the opening or port 88 which is adapted to be moved into and out of register with the outlet 13 by rotation of the plug 80.

For the purpose of rotating the plug, its outer end has a handle piece or knob 90 fixed thereon. The handle 90 may be fixed upon the plug member 80 to turn the same therewith—for example, by splaying the sides of the outer end of the plug member and providing the handle with a correspondingly formed opening for locking engagement therewith. A handle screw 91, threaded internally into the outer end of the plug member 80 and having its head cooperating with the handle member as shown, locks the handle member removably in place upon the plug member 80.

The reciprocatory reset stem 100 is disposed centrally within the shut-off plug member 80 in position coaxial with the valve member 68. Its lower end projects from the lower end of the handle screw 91, and has a reset button 102 threaded or otherwise fixed thereon. The reset button 102 has sliding movement in the axial opening 103 in the screw 91, and interposed between the reset button and a bearing or abutment member 104 is a coiled reset return spring 105. The stem 100 has reciprocatory movement through the member 104 which abuts an internal flange 106 on the plug member 80.

The upper surface of the flange 106 presents a valve seat 108, and fixed on the stem 100 for reciprocatory movement therewith is a reset valve member 109. In the position shown, the valve member 109 is seated upon the seat 108 by the spring 105 which returns the reset stem to projected position and prevents the escape of fuel outwardly along the stem 100 and reset button 102. A shut-off sleeve valve or cylinder 112 is fixed to the reset valve member 109 for reciprocatory movement with the reset stem 100. This sleeve valve or cylinder 112 is adapted when the reset stem is pressed upwardly in the resetting operation to slide within the cylindrical bore 114 in the plug member 80 and into position over and closing or shutting off the opening 88 to close or shut off communication between the interior of the valve body and the outlet 13, and thereby the supply of fuel to the burner supplied from the outlet 13. The sleeve valve or cylinder 112 has a vent opening 115 to equalize the pressure on opposite sides and prevent any interference with the movement of the valve sleeve 112 by a plunger action or the like.

The pilot burner (not shown) may be supplied with fuel by a pilot burner tube connected to the fuel supply pipe anterior of the valve body 11, or it may be supplied with fuel through a connection with the valve body 11 as disclosed in the copending application of Clarence Wantz hereinbefore identified.

The operation of the device is as follows:

When the pilot light is burning, the heat thereof upon the thermal junction 38 produces a thermo-electric current in the coil 50. The magnet frame 25 and armature 60 are preferably formed of an alloy of relatively low magnetic reluctance, and, as a result, the relatively weak thermo-electric current produces a magnetic field of sufficient strength so that when the armature 60 is placed in contact with the pole ends of the magnet frame by pushing the reset button 102, the magnetic attraction holds the armature in raised or attracted position against the magnet frame with a force greater than the force exerted by the spring 75, thereby holding the valve 68 in open position so long as the pilot flame is burning.

If the pilot flame is extinguished, the holding action of the electromagnet ceases to be sufficient to hold the armature 60 and valve 68 in attracted position, and the spring 75 moves the valve member 68 to closed position. The armature 60 moves to retracted position with the movement of the valve 68 to closed position, and the closing of the valve 68 shuts off the supply of fuel to the main burner.

When it is desired to reset the device the reset button 102 is engaged with the hand and pressed inwardly. The accompanying upward movement of the stem 100 and valve member 109 moves the valve sleeve 112 upwardly against the tension of the spring 105. The sleeve valve 112 closes the opening 88 to shut off the supply of fuel to the burner, and the upper end of the stem 100 contacts the valve member 68 and moves this valve member and the valve stem 62 and armature 60 upwardly as a unit until the armature comes into contact with the pole ends of the magnet frame 25 or is brought into attracted position and the valve member 68 is positioned in open position as shown.

If the pilot burner is lighted and sets up a thermo-electric current to hold the armature in attracted position, the valve 68 will remain open, and when the resetting button 102 is released the spring 105 returns the reset button and stem 100 to downwardly projected position as shown. As the reset stem moves downwardly, the sleeve valve 112 uncovers the opening 88 so that a supply of fuel may be set up to the main burner for ignition by the pilot light.

If, on the other hand, the pilot burner is not lighted to produce the thermo-electric current for holding the valve 68 open, this valve will move to closed position upon release of the button 102, and in this manner the device prevents the passage of fuel through the outlet and to the main burner until the pilot burner is lighted and a thermo-electric current set up to hold the armature in attracted position.

In order to turn on or shut off the supply of fuel to the burner independently of the valve 68 and, for example, with the pilot light burning and the armature 60 held in attracted position, the handle member 90 is grasped and turned to rotate the plug member 80. With the opening 88 in complete register with the outlet 13 as shown, the device is completely open for maximum supply of fuel to the burner. By rotating the plug 88 until the opening 88 is completely out of register with the outlet 13, the supply of fuel through the outlet 13, and thereby the supply of fuel to the burner, is completely shut off. Intermediate supplies of fuel through the outlet 13 may be provided by intermediate amounts of registration of the opening 88 with the outlet 13.

From the foregoing description it will be apparent that the shut-off cock and reset means for the thermo-electric control device is of simple and inexpensive construction and is adapted to be applied to and removed from the valve body 11, or similar structure, expeditiously and as a unitary structure. The shut-off cock and reset unit, when applied to the valve body 11, constitutes a unitary part of the control device, and the device is adapted to be operated conveniently and effectively and requires fewer joints or connections in the fuel supply line. The combined device is composed of relatively few parts as compared with two separate devices, and the parts are adapted for convenient manufacture and assembly.

Within the broader aspects of the invention the valve 88 may be in the form of a disc type valve or of other suitable form instead of comprising a tapered plug or cock type valve as shown in the drawing, and the broader of the appended claims are to be construed accordingly.

I do not intend to be limited to the precise details shown or described.

I claim:

1. In a device of the character described, in combination with a control device having an electromagnet provided with an armature connected to a controlling member and adapted when energized to hold said member in operating position and when deenergized to release said member for movement to a safety position, of a shut-off cock mounted in said control device, and a reset stem mounted in said shut-off cock and operable to reset said armature to attracted position and said controlling member to operating position.

2. In a device of the character described, in combination, a valve body having an inlet and an outlet and provided with an electromagnet having an armature connected to a valve member within said valve body and adapted when energized to hold said valve member in open position and when deenergized to release said valve member for movement to closed position, of a shut-off cock mounted in said valve body and operable to control the flow of fuel through said valve body when said valve member is in open position, and a reset stem mounted in said shut-off cock and operable to reset said armature to attracted position and said valve to open position.

3. In a device of the character described, in combination, a valve body having an inlet and an outlet and provided with an electromagnet having an armature connected to a valve member within said valve body and adapted when energized to hold said valve member in open position and when deenergized to release said valve member for movement to closed position, of a shut-off cock mounted in said valve body and operable to control the flow of fuel through said valve body when said valve member is in open position, a reset stem mounted in said shut-off cock and operable to reset said armature to attracted position and said valve to open position, and flow interrupter means carried by said reset stem and operable in said shut-off cock to interrupt the flow through the valve body during the resetting operation.

4. In a device of the character described, in combination, a valve body having inlet and outlet openings and provided at one end with an electromagnet having an armature connected to a valve member within said valve body and adapted when energized to hold said valve member in open position and when deenergized to release said valve member for movement to closed position, the opposite end of said valve body having a generally conical bore, a generally conical shut-off cock mounted in said bore and having a lateral opening for movement into and out of register with one of said inlet and outlet openings, and reset means mounted in said shut-off cock and operable to reset said armature to attracted position and said valve member to open position.

5. In a device of the character described, in combination, a valve body having inlet and outlet openings and provided at one end with an electromagnet having an armature connected to a valve member within said valve body and adapted when energized to hold said valve member in open position and when deenergized to release said valve member for movement to closed position, the opposite end of said valve body having a generally conical bore, a generally conical shut-off cock mounted in said bore and having a lateral opening for movement into and out of register with one of said inlet and outlet openings, a reset stem mounted in said shut-off cock and operable to reset said armature to attracted position and said valve member to operating position, and a sleeve valve member carried by said reset stem and slidable in the bore in said shut-off cock to close the lateral opening in said shut-off cock during the resetting operation.

6. In a device of the character described, in combination, a valve body having inlet and outlet openings and provided with an electromagnet having an armature connected to a valve member within said valve body and adapted when energized to hold said valve member in open position and when deenergized to release said valve member for movement to closed position, said valve body having a generally conical bore, a generally conical shut-off cock mounted in said bore, reset means mounted in said shut-off cock and operable to reset said armature to attracted position and said valve member to open position, stationary stop means on the valve structure, and a stop member splined upon said shut-off cock and engageable with said stationary stop means for limiting rotation of said shut-off cock.

7. In a device of the character described, in combination, a valve body having inlet and outlet openings and provided with an electromagnet having an armature connected to a valve member within said valve body and adapted when energized to hold said valve member in open position and when deenergized to release said valve member for movement to closed position, said valve body having a generally conical bore, a generally conical shut-off cock mounted in said bore, reset means mounted in said shut-off cock and operable to reset said armature to attracted position and said valve member to open position, stationary stop means on the valve structure, a stop member splined upon said shut-off cock and engageable with said stationary stop means for limiting rotation of said shut-off cock, a spring cap attached to the valve body, and a spring interposed between said stop member and said spring cap for maintaining the shut-off cock seated in the generally conical bore in said valve body.

8. In a device of the character described, in combination, a valve body having inlet and outlet openings and provided with an electromagnet having an armature connected to a valve member within said valve body and adapted when energized to hold said valve member in open position and when deenergized to release said valve member for movement to closed position, said valve body having a generally conical bore, a generally conical shut-off cock mounted in said bore, said shut-off cock extending from the valve body and having a handle part fixed upon its extending end, and a reset stem mounted in said shut-off cock and provided with a reset portion extending from said handle part, said reset stem being operable to reset said armature to attracted position and said valve member to open position.

9. In a device of the character described, in combination, a valve body having inlet and outlet openings and provided with an electromagnet having an armature connected to a valve member within said valve body and adapted when energized to hold said valve member in open position and when deenergized to release said valve member for movement to closed position, said valve body having a generally conical bore, a generally conical shut-off cock mounted in said bore, said shut-off cock extending from the valve body and having a handle part fixed upon its extending end, a reset stem mounted in said shut-off cock and provided with a resetting button extending from said handle part, said reset stem being operable to reset said armature to attracted position and said valve member to open position, a handle screw secured to the end of said shut-off cock for holding the handle thereon, shoulder means on said shut-off cock, and a reset stem return spring interposed between said shoulder means and said resetting button.

10. In a device of the character described, in combination with a control device having an electromagnet provided with an armature connected to a controlling member and adapted when energized to hold said member in operating position and when deenergized to release said member for movement to a safety position, of a shut-off cock mounted in said control device, a reset stem mounted in said shut-off cock and operable to reset said armature to attracted position and said controlling member to operating position, and a valve member carried by said reset stem for sealing the control device against leakage along said reset stem.

11. In a device of the class described, a first valve member, an electromagnet, an armature for said electromagnet which, when attracted, holds said first valve member in open position, said first valve member being operable to closed position when said armature is retracted, a second valve member operative to control the flow through said device, and cocking means mounted in said second valve member and operative to cock said armature to attracted position and said first valve member to open position, said cocking means being ineffective to operate said second valve member in the cocking operation.

12. In a device of the class described, a first valve member, an electromagnet, an armature for said electromagnet which, when attracted, holds said first valve member in open position, said first valve member being operable to closed position when said armature is retracted, a second valve member operative to control the flow through said device, cocking means mounted in said second valve member and operative to cock said armature to attracted position and said first valve member to open position, and flow interrupter means for shutting off the flow through the device in the cocking operation.

13. In a device of the class described, a first valve member, an electromagnet, an armature for said electromagnet which, when attracted, holds said first valve member in open position, said first valve member being operable to closed position when said armature is retracted, a rotatable valve plug for controlling the flow through said device, and cocking means mounted for reciprocatory movement in said valve plug and operative to cock said armature to attracted position and said first valve member to open position without actuating said valve plug.

14. In a device of the class described, a first valve member, an electromagnet, an armature for said electromagnet which, when attracted, holds said first valve member in open position, said first valve member being operable to closed position when said armature is retracted, a rotatable valve plug for controlling the flow through said device, cocking means mounted for reciprocatory movement in said valve plug and operative to cock said armature to attracted position and said first valve member to open position, and flow interrupter means for shutting off the flow through the device in the cocking operation.

15. In a device of the class described, a first valve member, an electromagnet, an armature for said electromagnet which, when attracted, holds said valve member in open position, said valve member being operable to closed position when said armature is retracted, a valve plug member mounted in said device and operative to control the flow therethrough independently of said first valve member, and cocking means mounted in said valve plug member and operative to cock said armature to attracted position and said first valve member to open position.

16. In a device of the class described, a first valve member, an electromagnet, an armature for said electromagnet which, when attracted, holds said valve member in open position, said valve member being operable to closed position when said armature is retracted, a valve plug member mounted in said device for controlling the flow therethrough, cocking means mounted in said valve plug member and operative to cock said armature to attracted position and said valve member to open position, and means operable with said cocking means for shutting off the flow through said device in the cocking operation.

17. In combination, a valve body having an inlet and an outlet, a first valve member in said valve body, an electromagnet mounted on said valve body, an armature for said electromagnet which, when attracted, holds said valve member in open position, said valve member being operable to closed position when said armature is retracted, a rotatable valve plug member mounted in said valve body substantially coaxial with said first valve member and said armature and operative to control the flow through said valve body, and cocking means mounted for reciprocatory movement in said valve plug member and operative to cock said armature to attracted position and said valve member to open position.

18. In combination, a valve body having an inlet and an outlet, a first valve member in said valve body, an electromagnet mounted on said valve body, an armature for said electromagnet which, when attracted, holds said valve member in open position, said valve member being operable to closed position when said armature is retracted, a rotatable valve plug member mounted in said valve body substantially coaxial with said first valve member and said armature and operative to control the flow through said valve body, cocking means mounted for reciprocatory movement in said valve plug member and operative to cock said armature to attracted position and said valve member to open position, and means operable within said valve plug member and with the operation of said cocking means for shutting off the flow through said valve body in the cocking operation.

JOHN H. THORNBERY.